US010362009B2

(12) United States Patent
Faynberg et al.

(10) Patent No.: US 10,362,009 B2
(45) Date of Patent: Jul. 23, 2019

(54) METHODS AND APPARATUS FOR AUTHENTICATION AND IDENTITY MANAGEMENT USING A PUBLIC KEY INFRASTRUCTURE (PKI) IN AN IP-BASED TELEPHONY ENVIRONMENT

(71) Applicant: Alcatel-Lucent USA Inc., Murray Hill, NJ (US)

(72) Inventors: Igor Faynberg, East Brunswick, NJ (US); Huilan Lu, Marlboro, NJ (US); Douglas W. Varney, Naperville, IL (US)

(73) Assignee: Nokia of America Corporation, Murray Hill, NJ (US)

( * ) Notice: Subject to any disclaimer, the term of this patent is extended or adjusted under 35 U.S.C. 154(b) by 255 days.

(21) Appl. No.: 15/244,591

(22) Filed: Aug. 23, 2016

(65) Prior Publication Data
US 2016/0359824 A1    Dec. 8, 2016

Related U.S. Application Data

(62) Division of application No. 12/100,781, filed on Apr. 10, 2008, now abandoned.

(51) Int. Cl.
*H04L 29/06*    (2006.01)
*H04L 9/32*    (2006.01)
(Continued)

(52) U.S. Cl.
CPC ............ *H04L 63/061* (2013.01); *H04L 9/006* (2013.01); *H04L 9/3263* (2013.01);
(Continued)

(58) Field of Classification Search
CPC .............. H04L 63/061; H04L 63/0853; H04L 63/0435; H04L 63/0442; H04L 65/1073;
(Continued)

(56) References Cited

U.S. PATENT DOCUMENTS 6,249,867 B1 *    6/2001   Patel ...................... H04L 9/0841
380/255
2003/0200433 A1 *    10/2003   Stirbu ................... H04L 9/0844
713/169
(Continued)

FOREIGN PATENT DOCUMENTS

CN    1859097 A    11/2006
CN    101030854 A    9/2007
(Continued)

OTHER PUBLICATIONS

International Telecommunication union (ITU), Series Y: Global Information Infrastructure, Internet Protocol Aspects and Next-Generation Networks Next Generation Networks—Security NGN identity Management, Jan. 2011, ITU Telecommunications Standardization Sector, Y.2722, pp. 1-50. (Year: 2011).*
(Continued)

*Primary Examiner* — Nelson Giddins
(74) *Attorney, Agent, or Firm* — Ryan, Mason & Lewis, LLP

(57) ABSTRACT

Methods and apparatus are provided for user authentication using a Public Key Infrastructure (PKI) in an IP-based telephony environment, such as an IMS network. A user of a user device attempting to access an IP-based telephony network can be authenticated by obtaining one or more private keys of the user from a secure memory associated with the user device; generating an integrity key and a ciphering key; encrypting the integrity key and the ciphering key using a session key; encrypting the session key with a public key of the IP-based telephony network; and providing the encrypted session key, encrypted integrity key and encrypted ciphering key to the IP-based telephony network for authentication. A network-based method is also provided for authenticating a user in an IP-based telephony network.

25 Claims, 3 Drawing Sheets

(51) Int. Cl.
*H04W 12/06* (2009.01)
*H04L 9/00* (2006.01)
*H04W 12/12* (2009.01)

(52) U.S. Cl.
CPC ........ *H04L 9/3271* (2013.01); *H04L 63/0435* (2013.01); *H04L 63/0442* (2013.01); *H04L 63/0853* (2013.01); *H04L 65/1016* (2013.01); *H04L 65/1073* (2013.01); *H04W 12/06* (2013.01); *H04L 2209/80* (2013.01); *H04W 12/12* (2013.01)

(58) Field of Classification Search
CPC ... H04L 65/1016; H04L 9/3263; H04L 9/006; H04L 9/3271; H04L 2209/80; H04W 12/06; H04W 12/12
See application file for complete search history.

(56) References Cited

U.S. PATENT DOCUMENTS

| | | | |
|---|---|---|---|
| 2006/0079205 A1 | 4/2006 | Semple et al. | |
| 2006/0120531 A1* | 6/2006 | Semple | H04L 9/3271 380/270 |
| 2006/0206710 A1* | 9/2006 | Gehrmann | H04L 9/0841 713/168 |
| 2006/0281442 A1* | 12/2006 | Lee | H04L 9/3273 455/412.2 |
| 2007/0234034 A1* | 10/2007 | Leone | H04L 63/0869 713/150 |
| 2007/0234041 A1* | 10/2007 | Lakshmeshwar | H04L 9/3271 713/156 |
| 2008/0273704 A1* | 11/2008 | Norrman | H04L 63/062 380/278 |
| 2011/0004754 A1* | 1/2011 | Walker | H04L 9/3271 713/168 |

FOREIGN PATENT DOCUMENTS

| | | |
|---|---|---|
| CN | 101053273 | 10/2007 |
| CN | 101156486 A | 4/2008 |
| JP | 2002232418 | 8/2002 |
| JP | 2004048596 | 2/2004 |
| JP | 2006270363 | 10/2006 |
| WO | 2002054663 | 7/2002 |
| WO | 2003105049 | 12/2003 |
| WO | 2006018889 | 2/2006 |
| WO | 2007015075 | 2/2007 |
| WO | 2007062882 | 6/2007 |
| WO | 2008000721 | 1/2008 |
| WO | 2008005162 | 1/2008 |
| WO | 2008151663 | 12/2008 |

OTHER PUBLICATIONS

Zheng et al., "AKA and Authorization Scheme for 4G Mobile Networks Based on Trusted Mobile Platform", Fifth International Conference on Information, Communications and Signal Processing, pp. 976-980, Dec. 2005.

Hu et al., "PKI and Secret Key Based Mobile IP Security", Communications, Circuits and Systems Proceedings, IEEE International Conference, pp. 1605-1609 (2006).

Kambourakis et al., "Inter/Intra Core Network Security with PKI for 3G-and-Beyond Systems", Networking Technologies, Services, and Protocols; Performance of Computer and Wireless Communications; Springer-Verlag, Berlin/Heidelberg, pp. 13-24 (2004).

Note, "Subtests of 'Nonobviousness': A Nontechnical Approach to Patent Validity," 112 U. Pa. L. Rev. 1169, 1178-80 (1964).

Faynberg et al., "On New Security Mechanisms for Identity Management; Recognizing and Meeting Telecon Operator and Enterprise Needs", Bell Labs Technical Journal 15(1), 95-114 (2010).

"Series Y:Global Information Infrastructure, Internet Protocol Aspects and Next-Generation Networks, NGN Identity Management Mechanismis" Recommendation ITU-T Y.2722 (Jan. 2011).

Fu Xiaoqing, el al., "Research of Public Key-based 3G Security", Information Security and Communications Privacy, 2016.

* cited by examiner

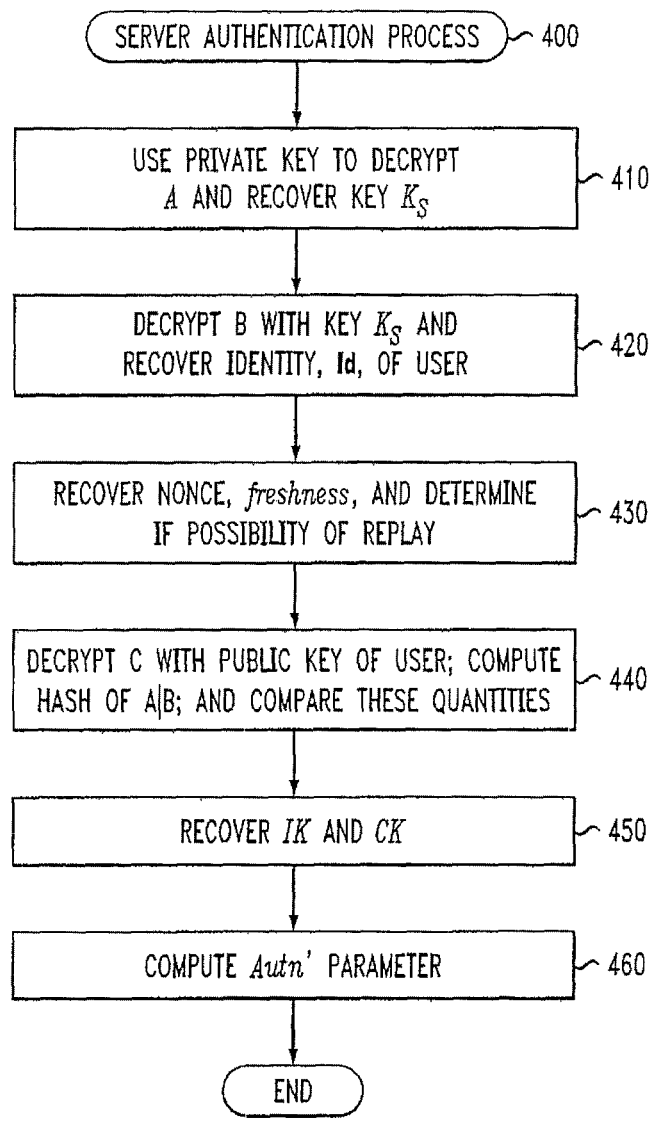

METHODS AND APPARATUS FOR AUTHENTICATION AND IDENTITY MANAGEMENT USING A PUBLIC KEY INFRASTRUCTURE (PKI) IN AN IP-BASED TELEPHONY ENVIRONMENT

CROSS-REFERENCE TO RELATED APPLICATIONS

This application is a divisional of U.S. patent application Ser. No. 12/100,781, filed Apr. 10, 2008, incorporated by reference herein.

FIELD OF THE INVENTION

The present invention relates to user authentication techniques and, more particularly, to methods and apparatus for user authentication in IP-based telephony networks.

BACKGROUND OF THE INVENTION

The IP Multimedia Subsystem (IMS) is an architectural framework for delivering Internet Protocol (IP) multimedia to mobile users. An IMS network is typically divided into an access domain and a network domain, each having its own security specification. A user may access an IP network via the access network of an access network provider, and then access different services, such as voice, video and streaming media, through one or more service networks provided by one or more service network providers.

Authentication in an IMS network is typically based on the known Authentication and Key Agreement (AKA) mechanism AKA is a security protocol typically used in 3G networks. AKA is a challenge-response based authentication mechanism that uses a shared secret and symmetric cryptography. AKA results in the establishment of a security association (i.e., a set of security data) between the user equipment and the IMS network that enables a set of security services to be provided to the user.

Public cryptography has not been widely employed in the telephony domain. There is a growing trend, however, to employ a public key infrastructure (PKI) for authentication in the telephony domain, such as in IMS networks. While public cryptography techniques can significantly improve the security of an IMS network, there are a number of technical considerations that have previously limited the use of public cryptography techniques in IMS networks. In particular, there is a concern that the private keys can be recovered from the allegedly "secure" volatile memory contained in the user equipment. Thus, any solution that would allow even temporary storage of private keys in a terminal memory is deemed unacceptable.

A need therefore exists for end user-to-network authentication based on the Public Key Infrastructure (PKI) within an IMS network. Another need exists for methods and apparatus for authenticating a user in an IMS network that ensure that the private keys are stored on a secure smart card or another secure memory. Yet another need exists for methods and apparatus for authenticating a user in an IMS network that ensure that all computations that involve the private keys are performed on the secure smart card or another secure processor.

SUMMARY OF THE INVENTION

Generally, methods and apparatus are provided for user authentication using a Public Key Infrastructure (PKI) in an IP-based telephony environment, such as an IMS network. According to one aspect of the invention, an authentication method is provided that is performed by a user device attempting to access an IP-based telephony network. One or more private keys of the user are initially obtained from a secure memory associated with the user device. The secure memory may be, for example, a component of a smart card having an IMS Subscriber Identity Module (ISIM) that can securely store data and perform computations on the data. Thereafter, the disclosed method generates an integrity key and a ciphering key; encrypts the integrity key and the ciphering key using a session key; encrypts the session key with a public key of the IP-based telephony network; and provides the encrypted session key, encrypted integrity key and encrypted ciphering key to the IP-based telephony network for authentication.

According to another aspect of the invention, a method is provided for authenticating a user employing a user device attempting to access an IP-based telephony network. The user is authenticated by obtaining an encrypted session key encrypted with a public key of the IP-based telephony network; obtaining an encrypted integrity key and encrypted ciphering key from the user device, wherein the integrity key and the ciphering key were generated by a secure device associated with the user device using one or more private keys of the user; decrypting the encrypted session key using the public key of the IP-based telephony network; decrypting the encrypted integrity key and encrypted ciphering key using the decrypted session key; and authenticating the user device based on a Public Key Infrastructure (PKI) computation.

In various exemplary implementations, one or more of the encrypted session key, the encrypted integrity key and the encrypted ciphering key can optionally be encrypted using the one or more private keys. In addition, a user identity can be encrypted using the session key. In this manner, the user identity can be obtained only by a holder of the session key. A nonce can be employed to protect against a replay attack.

A more complete understanding of the present invention, as well as further features and advantages of the present invention, will be obtained by reference to the following detailed description and drawings.

BRIEF DESCRIPTION OF THE DRAWINGS

FIG. 4 is a flow chart describing an exemplary implementation of a server authentication process for use by a network server in an IP-based telephony network.

DETAILED DESCRIPTION

The present invention provides end user-to-network authentication based on the Public Key Infrastructure (PKI) within an IMS network. According to one aspect of the invention, a user is authenticated in an IMS network using one or more private keys that are stored, for example, on a secure smart card having an IMS Subscriber Identity Module (ISIM), or a secure set-up box for IPTV, associated with the user equipment. According to another aspect of the invention, when a user is authenticated in an EMS network, all computations that involve the private keys are performed on the secure smart card or another secure processor. As used herein, a "secure" device, such as a smart card, shall comprise a device that satisfies one or more predefined security standards. For example, a smart card having an ISIM shall comprise a secure smart card.

Generally, the disclosed pubic key cryptography techniques perform a mutual end user-to-network authentication for an IMS network that results in a key agreement that is substantially similar to the conventional AKA authentication mechanism. In addition, the disclosed pubic key cryptography techniques do not require a shared secret.

Figure 1:
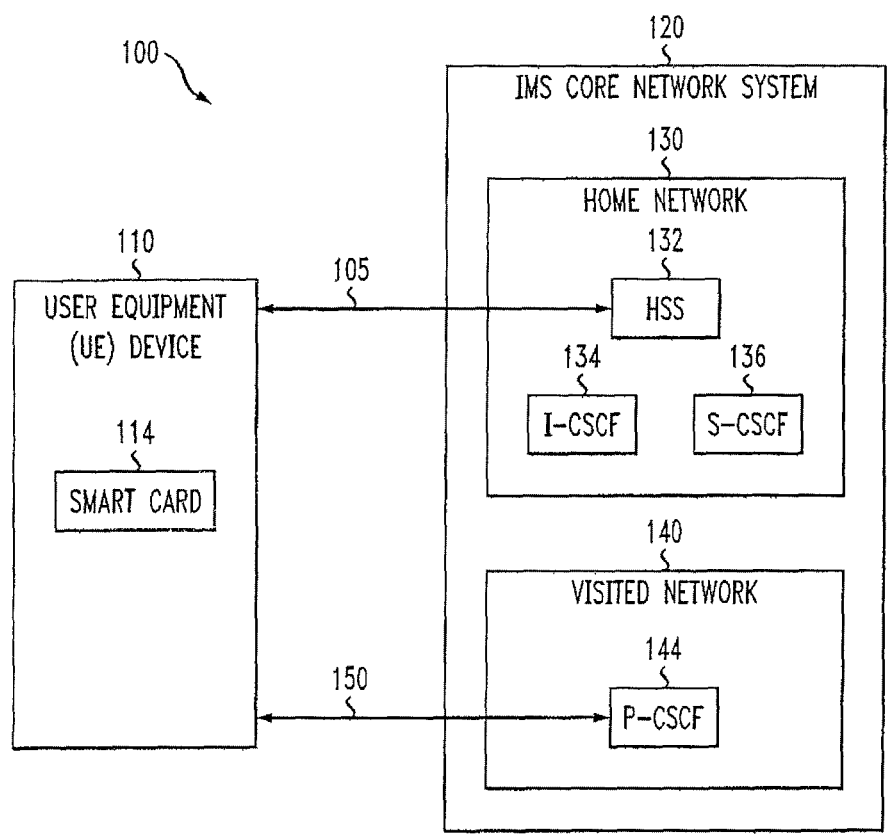
FIG. 1 illustrates an exemplary IMS network environment in which the present invention may be employed.

FIG. 1 illustrates an exemplary IMS network environment 100 in which the present invention may be employed. While the present invention is illustrated herein in the context of an exemplary IMS network environment 100, the present invention can also be employed in other IP-based telephony networks, such as SIP and cable television networks, as would be apparent to a person of ordinary skill in the art. As shown in FIG. 1, the exemplary IMS network environment 100 comprises a user equipment (UE) device 110, and an IMS core network system 120. The user equipment device 110 represents the user terminal (such as a wireless phone or a set-up box) and comprises an associated smart card 114, for example, having an ISIM application. As used herein, a smart card 114 represents any entity that can securely store secret data and also perform computations on that data. The IMS core network system 120 comprises a home network 130 and a visited network 140.

The home network 130 comprises a home subscriber server (HSS) 132, an Interrogating Call Session Control Function (I-CSCF) 134 and a Serving Call Session Control Function (S-CSCF) 136. The S-CSCF 136 can alternatively be implemented as any network server that is responsible for user authentication. The visited network 140 comprises a Proxy Call Session Control Function (P-CSCF) 144. Generally, a Call Session Control Function (CSCF) entity defined in the IMS network is adapted to accomplish functions such as control and routing during a call or session.

Proxy, Interrogating and Serving CSCFs are distinguished based on their corresponding functions. The P-CSCF 144 is adapted for an access of the user equipment 110, and any user equipment 110 shall gain an access to the IMS network 100 through the P-CSCF 144. The S-CSCF 136 provides core functions such as session control and routing. The I-CSCF 134 is adapted for selection of the S-CSCF 136 and the intercommunication between different service providers or different area networks. The HSS 132 is adapted to store subscription data and configuration data of subscribers (for example, the user's certificates), and to support a function of Authentication & Authorization (AAA) for the subscribers.

As shown in FIG. 1, each user equipment device 110 includes a first interface 105 and a second interface 150. Interface 105 is a bidirectional authentication interface between the user equipment device 110 and the IMS network 100. Interface 105 is adapted to enable a subscriber authentication function. Interface 150 is adapted to provide communication security between the user equipment device 110 and the P-CSCF 144.

As previously indicated, interfaces 105 and 150 are typically implemented in the 3GPP through application of an IMS AKA mechanism during a registration process for the user equipment. The present invention, however, provides end user-to-network authentication based on the Public Key Infrastructure (PKI) within an IMS network.

As discussed further below, an aspect of the present invention augments an existing smart card having an ISIM application or another secure storage device associated with the user equipment device 110 with the private key of the user, the network certificate, an (optional) function for generating an Integrity Key (IK) and Cipher Key (CK) based on the private key, and a capability of the ISIM application to perform the encryption with at least one existing PKI algorithm (such as RSA, Elliptic Curves, or El Gamal) to be chosen by a network provider. A further aspect of the present invention augments the IMS authentication with a new protocol exchange among the end-user terminal, ISIM, and Serving Call Session Control Function (S-CSCF).

Figure 2:
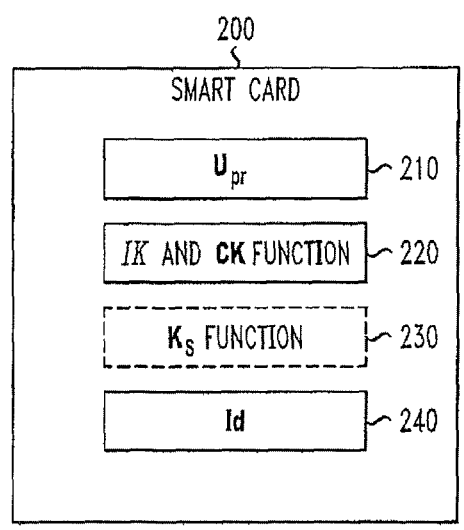
FIG. 2 is a block diagram of an exemplary smart card incorporating features of the present invention.

FIG. 2 is a block diagram of an exemplary smart card 200, such as an ISIM, incorporating features of the present invention. As shown in FIG. 2, the exemplary smart card 200 comprises:

1) One or more user's private keys 210 (for signature and encryption), of which, for simplicity, only one, $U_{pr}$, is used herein;

2) A function 220 (typically already present in an ISIM card) for computing the integrity key, IK, and the ciphering key, CK. The function 220 may need to be augmented to use as an input, a private key, or some other key material in place of the ISIM shared secret, as discussed hereinafter;

3) (Optionally), a function 230 for randomly computing a one-time session key, $K_S$, that is used to encrypt the other keys as discussed below and also serves as a challenge for the network-to-user authentication. This key is generally equal in length to combined lengths of the IK and CK keys; and 4) The user public and private identities 240 (such as IMS Private User Identity (IMPI) and IMS Public User Identity (IMPU) in IMS), for the purposes of illustration, grouped into one string, Id. It is noted that the user's certificate can bind the IMPI with the user's public keys.

Figure 3:
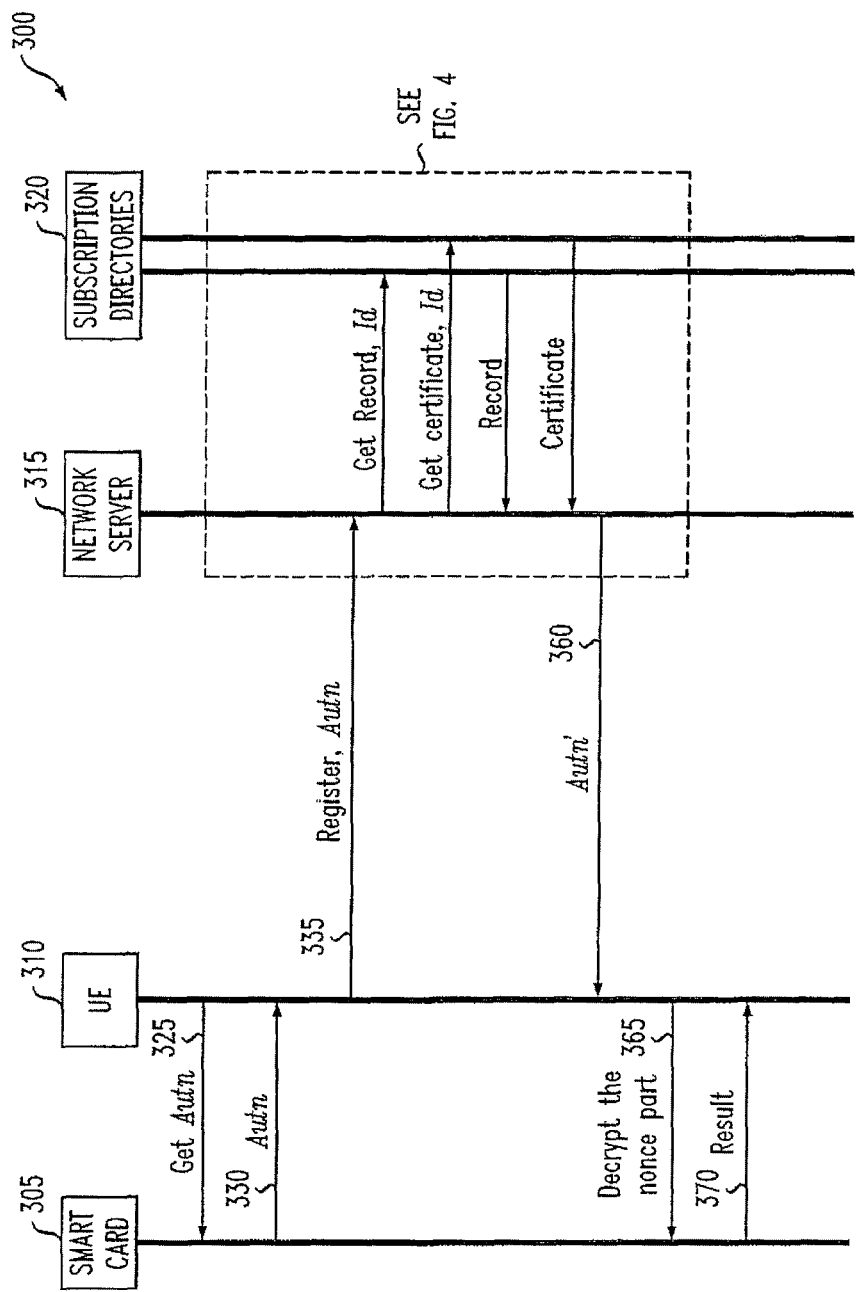
FIG. 3 is a flow chart describing an exemplary implementation of a PKI authentication process for use in an IP-based telephony network, such as an IMS network.

FIG. 3 is a flow chart describing an exemplary implementation of a PKI authentication process 300 for use in an IMS network. Generally, a session commences when the UE 310 attempts to register with the network 100. In order to register, the UE 310 needs to authenticate to the network and authenticate the server as the one that belongs to the network. With the PKI authentication of the present invention, this is achieved through the use of certificates (see, for example, ITU-T Rec. X.509). In this case, it is assumed (although this assumption is not essential) that the network acts as a certification authority, and so the network certificate with the public key of the network is located in the smart card 200.

To start the registration, the UE 310 requests during step 325 that the smart card 305 provides the authenticator, Autn. The smart card 305 computes (possibly, in cooperation with the UE 310, as explained below) the authenticator, Autn, and delivers the authenticator, Autn, to the UE 310 during step 330, as discussed further below in the section entitled "Computation of the Authenticator, Autn."

Once the Autn parameter has been computed, it is passed along to the Network Server 315 during step 335, for example, as part of a Register message (such as a SIP Register method). It is not essential that this authentication procedure is performed during the registration. Technically, the authentication procedure can be performed at any time when the authentication is needed and be part of any protocol, as would be apparent to a person of ordinary skill in the art.

Although unnecessary (and possibly wasteful of bandwidth and execution time), it is possible that the user includes its certificate along with the Autn parameter. In this case, of course, the procedure of the retrieval of the certificate by the network server 315 as described below is replaced by the procedure of verifying the certificate in its chain.

Upon the reception of the Autn parameter, the network server 315 performs a server authentication process 400, discussed further below in conjunction with FIG. 4. Generally, the authentication process 400 authenticates the user based on the received Autn parameter and computes an Autn' parameter that the network server 315 uses to authenticate itself to the user. The Autn' parameter is transmitted to the UE 310 during step 360.

When the UE 310 receives the Autn' parameter message, the UE 310 checks the network signature, while handing out the part that corresponds to the encrypted nonce to the smart card 305 during step 365 for the private-key-based decryption. If either the integrity check of the message fails, or the decrypted value is not equal to freshness+1, the UE 310 proceeds according to the network policy for this specific case. If both checks pass, the procedure is complete (step 370).

Computation of the Authenticator, Autn

As discussed above in conjunction with FIG. 3, the smart card 305 computes the authenticator, Autn, during step 330. The authenticator, Autn, can be expressed as follows:

$$\text{Autn} = U_{pr}\{N_{pu}[K_S]\backslash K_S[Id, \text{freshness}, IK\backslash CK]\},$$

where:

1) freshness is a nonce (such as a timer value, or the IMS SEQ parameter, or any other nonce) that protects the communication against the replay attack; and is generally equal in length to combined lengths of the IK and CK keys;

2) "|" designates the string concatenation operation;

3) $K_S$ [ . . . ] designates a symmetric key encryption operation (such as DES, triple-DES, AES, or a one-time pad) performed with the key $K_S$);

4) $N_{pu}$ [ . . . ] designates the encryption with the network public key $N_{pu}$ available from the network certificate; and 5) $U_{pr}$ [ . . . ] designates the signature operation with the user's private signature key. For example, first a hash (such as SHA2 hash) of the argument is computed, then the result is encrypted with that key, and finally this result is concatenated with the argument. The presence of the signature solves two problems: first, it protects the integrity of the message, and, second, it provides (in combination with the freshness parameter), the non-repudiation feature, which is typically essential to operators inasmuch as it constitutes the proof that the session was initiated by the user.

Thus, the resulting Autn string, consists of three concatenated components:

Autn=|A|B|C, where $A = N_{pu}[K_S]$ can be decrypted only by the network;

$B = K_S[Id, \text{freshness}, IK\backslash CK]$ allows recovery of the Id and keys only to the holder of the key $K_S$, which, again, can be derived only by the network from A; and $C = U_{pr}[\text{Hash}(A\backslash B)]$ allows checking of the integrity of the previous two components as well as to prove to the receiver that the message was issued by the user.

It is noted that the identity of the user (contained in B) is fully protected.

It is further noted that the step of separately computing B is not essential. It is used, as is the practice, to minimize the expensive private-key computation. The alternative is to compute $A = N_{pu}[Id, \text{freshness}, IK\backslash CK]$ and omit B altogether, in which case there may be no need to derive $K_S$.

To optimize the performance, certain pieces of the above computation (i.e., the ones that do not involve the user private key operations) can actually be performed at the UE 310, in which case one or more messages carrying the results of such computations may need to be exchanged between the UE 310 and the smart card 305.

The only operation that is generally always performed on the card 305 in the exemplary embodiments of the invention is the signature with the private key. Ultimately, it is the only potentially intensive computation required, compared to the rest of the computations.

Server Authentication Process 400

As discussed above in conjunction with FIG. 3, the network server 315 performs an server authentication process 400 to authenticate the user based on the received Autn parameter and to compute an Autn' parameter that the network server 315 uses to authenticate itself to the user.

FIG. 4 is a flow chart describing an exemplary implementation of a server authentication process 400 for use by a network server 315 in an IMS network. As shown in FIG. 4, the network server 315 initially uses its private key during step 410 to decrypt A and recover the key $K_S$ from the received Autn parameter as the means of recovering other parameters.

The server authentication process 400 then proceeds to decrypt B with the key $K_S$ and recover the identity, Id, of the user during step 420. Once the identify is obtained, the network server 315 checks if there is a record in the subscription directory 320 of legitimate users indexed by this identity, and, if so, whether the user is authorized to register or receive any other service specified by the particular protocol message in which this parameter has been carried. The network server 315 also retrieves the certificate of the user (unless there is a necessity of the certificate to be sent by the user as described above). If there is no entry in the table, the processing stops and, depending on the network security policy, the event may be logged, or in case of server overload reported as a denial of service attack.

The network server 315 proceeds to recover the nonce, freshness, and determines if there is a possibility of the replay during step 430. If, for example, the timestamp is used, the network server 315 checks if it is in the acceptable time window. Likewise, if a sequence number (such as sequence in the AKA algorithm) is used, again, the network server 315 will check if its value is in acceptable range (and, if not, it may initiate re-sequencing procedure with the UE 310). If the examination fails, the processing stops and, depending on the network security policy, the event may be logged, or in case of server overload reported as a denial of service attack, especially if there is an obvious indication of replay.

During step 440, the network server 315 a) decrypts C with the public key of the user (obtained from the user's certificate); b) computes the hash of A|B; and c) compares the quantities obtained in a) and b). If these quantities are different, the message is considered tampered with, and the event may be logged, or in case of server overload reported as a denial of service attack. (This step may precede step 3.)

The network server 315 then proceeds to recover IK and CK during step 450. At this point, the authentication of the user 310 to the network has completed, and the network has the same information as it would have had with an AKA authentication technique.

To authenticate itself to the user (and effectively acknowledge the success of the user's authentication), the network server 315 computes the Autn' parameter during step 460, as follows:

$$\text{Autn}' = N_{pr}\{U_{pu}[\text{freshness}+1]\}),$$

where

1) $U_{pu}$ [ ... ] designates the encryption with the user's public key $U_{pu}$ available from the user's certificate; and 2) $N_{pr}$ { ... } designates the signature operation with the network private signature key: first a hash (such as SHA2 hash) of the argument is computed, then the result is encrypted with that key, and finally this result is concatenated with the argument. The presence of the signature solves two problems: first, it protects the integrity of the message, and, second and most important, it provides a proof that the message came from the network.

Conclusion

Among other benefits, the present invention ensures substantially perfect forward secrecy of the IMS session in that the secrecy of a session is not less secure than that relying on the existing EMS authentication mechanism (AKA). The present invention also ensures that other-factor authentication mechanisms present in AKA (such as the sequence number, SQN) can also be used if desired by the network operator. The present invention can also ensure user privacy in that the user identity does not need to be transmitted in the clear. Finally, the present invention can optionally ensure that only absolutely necessary computations are performed on the smart card, recognizing inefficiency of such computations.

While FIGS. 3 and 4 show an exemplary sequence of steps, it is also an embodiment of the present invention that the sequence may be varied. Various permutations of the algorithm are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, microcontroller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method performed by a user device attempting to access an Internet Protocol-based telephony network, comprising:

encrypting a session key with a public key of said Internet Protocol-based telephony network; and providing, using at least one processing device, said encrypted session key and a value encrypted with said session key as part of a register message to a server of said Internet Protocol-based telephony network for authentication of said user device with said Internet Protocol-based telephony network using a Public Key Infrastructure in conjunction with an Authentication Key Agreement mechanism, wherein said server obtains said session key from said register message using said public key and uses said session key to obtain said value, wherein said server authenticates said user device based on said value.

2. The method of claim 1, further comprising the steps of generating an integrity key and a ciphering key and wherein one or more of said integrity key and said ciphering key are generated using one or more private keys of said user.

3. The method of claim 2, wherein said generating step is performed by a smart card.

4. The method of claim 3, wherein said smart card comprises a secure memory for storing said one or more private keys of said user.

5. The method of claim 4, wherein at least one of:

said smart card comprises a secure Internet Protocol Multimedia Subsystem Subscriber Identity Module; and wherein said smart card is configured to securely store data and to perform computations on said data.

6. The method of claim 1, further comprising the step of encrypting one or more of said encrypted session key, an encrypted integrity key and an encrypted ciphering key using one or more private keys of said user.

7. The method of claim 1, further comprising the steps of encrypting an integrity key and a ciphering key using said session key and encrypting a user identity using said session key.

8. The method of claim 7, wherein said user identity can be obtained only by a holder of said session key.

9. The method of claim 1, further comprising the step of receiving an authentication of said server of said Internet Protocol-based telephony network.

10. The method of claim 1, wherein said value comprises a nonce that protects against a replay attack.

11. The method of claim 1, wherein said Internet Protocol-based telephony network is an Internet Protocol Multimedia Subsystem network.

12. The method of claim 1, wherein said authentication of said user further comprises said server comparing said value obtained from said registration message to a version of said value computed by said server.

13. The method of claim 1, wherein said providing said encrypted session key and the value encrypted with said session key comprises:
providing a string comprising three concatenated components as part of the register message, wherein the three concatenated components comprise said encrypted session key, said value encrypted with said session key, and a signature of a hash of the other two concatenated components with a private key of the user, and wherein said server decrypts the signature with a public key of the user, computes the hash of the other two concatenated components and compares the computed hash and the provided hash to perform an integrity check.

14. An apparatus, comprising:
a secure memory for storing one or more private keys of a user attempting to access an IP-based telephony network; and
at least one processing device, coupled to the secure memory, operative to:
encrypt a session key with a public key of said Internet Protocol telephony network; and
provide, using said at least one processing device, said encrypted session key and a value encrypted with said session key as part of a register message to a server of said Internet Protocol-based telephony network for authentication of said user device with said Internet Protocol-based telephony network using a Public Key Infrastructure in conjunction with an Authentication Key Agreement mechanism, wherein said server obtains said session key from said register message using said public key and uses said session key to obtain said value, wherein said server authenticates said user device based on said value.

15. The apparatus of claim 14, wherein said secure memory further comprises a network certificate containing said public key of said network.

16. The apparatus of claim 14, wherein said secure memory further comprises an identifier of said user.

17. The apparatus of claim 14, wherein said at least one processing device is further configured to perform an encryption with at least one public key infrastructure algorithm.

18. The apparatus of claim 14, wherein said at least one processing device is further configured to generate said session key.

19. The apparatus of claim 14, wherein said authentication of said user further comprises said server comparing said value obtained from said registration message to a version of said value computed by said server.

20. The apparatus of claim 14, wherein said at least one processing device is further configured to generate an integrity key and a ciphering key and wherein one or more of said integrity key and said ciphering key are generated using said one or more private keys of said user.

21. The apparatus of claim 20, wherein at least one of:
said generating is performed by a smart card; and
said smart card comprises said secure memory for storing said one or more private keys of said user.

22. The apparatus of claim 14, wherein said at least one processing device is further configured to encrypt one or more of said encrypted session key, an encrypted integrity key and an encrypted ciphering key using said one or more private keys of said user.

23. The apparatus of claim 14, wherein said at least one processing device is further configured to encrypt an integrity key and a ciphering key using said session key and encrypting a user identity using said session key.

24. The apparatus of claim 23, wherein said user identity can be obtained only by a holder of said session key.

25. The apparatus of claim 14, wherein said provision of said encrypted session key and the value encrypted with said session key comprises:
providing a string comprising three concatenated components as part of the register message, wherein the three concatenated components comprise said encrypted session key, said value encrypted with said session key, and a signature of a hash of the other two concatenated components with a private key of the user, and wherein said server decrypts the signature with a public key of the user, computes the hash of the other two concatenated components and compares the computed hash and the provided hash to perform an integrity check.

* * * * *